(12) United States Patent
Hicks et al.

(10) Patent No.: US 7,844,506 B2
(45) Date of Patent: Nov. 30, 2010

(54) METHOD, SYSTEM, AND PROGRAM PRODUCT FOR AUTOMATICALLY POPULATING A FIELD OF A RECORD

(75) Inventors: Scott D. Hicks, Underhill Center, VT (US); Victoria A. Locke, Newburgh, NY (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 1275 days.

(21) Appl. No.: 11/184,336

(22) Filed: Jul. 19, 2005

(65) Prior Publication Data

US 2007/0022094 A1 Jan. 25, 2007

(51) Int. Cl.
*G06Q 10/00* (2006.01)
(52) U.S. Cl. ........................................................ 705/28
(58) Field of Classification Search .................. None
See application file for complete search history.

(56) References Cited

U.S. PATENT DOCUMENTS 7,197,696 B1 * 3/2007 Muzumdar .................. 715/209

* cited by examiner

*Primary Examiner*—Kevin L Ellis
*Assistant Examiner*—Gary W Cygiel
(74) *Attorney, Agent, or Firm*—Anna L. Linne; Hoffman Warnick LLC

(57) ABSTRACT

Under the present invention an identifier for a computer system undergoing an IT migration is extracted from a pertinent field the record. Thereafter, a mapping table is consulted. The mapping table generally contains entries that associate computer system identifiers with identifiers of hardware components that have been installed (or are to be installed) in the computer systems. Using the computer system identifier extracted from the record, an associated hardware component identifier is determined from the mapping table, and automatically populated into a corresponding field (e.g., a hardware component field) of the record. Thus, the present invention avoids having to manually populate the hardware component identifier into the record.

20 Claims, 5 Drawing Sheets

○ LAB MACHINE INFORMATION LOTUS NOTES

FILE  EDIT  VIEW  ACTIONS  HELP

ADDRESS

| WELCOME | REPLICATION | JAMES A. SM.. | WORKSPACE |

▲ CLOSE

ETHERNET ADAPTER INFORMATION:

| ALREADY HAS A SUPPORTED ADAPTER ? NO | ALREADY HAS A SUPPORTED ADAPTER ? NO | ADAPTER ORDERED ?: ○YES ●NO | ADAPTER RECEIVED ?: ○YES ●NO |

SUPPORTED CARD VERIFIED AS EITHER PRESENT OR NOT PRESENT ?
YES

EXISTING ADAPTER PART NUMBER
(IF SUPPORTED):

RECOMMENDED ADAPTER:

ADAPTER PART NUMBER TO ORDER:

ADAPTER QUANTITY:
1

ADAPTER COST:

PREVIOUS PART NUMBER:

MISMATCH APPROVED ?:

RISC MES:

ORDERED BY CUSTOMER ?:
NO

DATE ADAPTER ORDERED:

RISC MES ORDER DATE:

DATE ADAPTER RECEIVED:

RISC MES SHIP DATE:

LOTUS ▶                                                                                    1:06 PM

LAB MACHINE INFORMATION LOTUS NOTES

FILE EDIT VIEW ACTIONS HELP

ADDRESS

WELCOME | REPLICATION | JAMES A. SM.. | WORKSPACE

▲ CLOSE

| ETHERNET ADAPTER INFORMATION: | | | |
|---|---|---|---|
| ALREADY HAS A SUPPORTED ADAPTER ?<br>NO | ALREADY HAS A SUPPORTED ADAPTER ?<br>NO | | |
| SUPPORTED CARD VERIFIED AS EITHER PRESENT OR NOT PRESENT ?<br>YES | | | |
| EXISTING ADAPTER PART NUMBER (IF SUPPORTED): | | | |
| RECOMMENDED ADAPTER: | | ADAPTER ORDERED ?: ○YES ●NO | ADAPTER RECEIVED ?: ○YES ●NO |
| ADAPTER PART NUMBER TO ORDER:<br>06P4003 | | ORDERED BY CUSTOMER ?:<br>NO | |
| ADAPTER QUANTITY:<br>1 | | | |
| ADAPTER COST: | | | |
| PREVIOUS PART NUMBER: | | | |
| MISMATCH APPROVED ?: | | DATE ADAPTER ORDERED: | DATE ADAPTER RECEIVED: |
| RISC MES: | | RISC MES ORDER DATE: | RISC MES SHIP DATE: |

LOTUS ▼                                                                                       1:06 PM

| ADAPTER PN TO ORDER | BUILDING/ FLOOR | MIGRATION STATUS | PROJECTED DEPLOYMEN |
|---|---|---|---|
| ▷ 02N7191 | | | 1 |
| ▷ 06P4003 | | | 36 |
| ▷ 1L6573 | | | 35 |
| ▷ FC2968 | | | 4 |
| ▷ FC2994 | | | 1 |
| ▷ FC4962 | | | 2 |
| ▷ SERVER | | | 2 |
| ▷ UNKNOWN | | | 6 |
| | | | 87 |

EMM TEST AND DEVELOPMENT
- ▷ 02.0 PORTS
- ▷ 03.0 MACHINES
- ▽ 04.0 ADAPTERS
  - ☐ 04.01 BY BUILDING/FLOOR/MACHINE CLAS
  - ☐ 04.02 ADAPTERS ORDERED BY BUILDING/
  - ☐ 04.03 ADAPTER PN ORDERED
  - ☐ 04.04 BY DIVISION
  - ☐ 04.05 ADAPTER PART NUMBER MISMATCH
  - ☐ 04.06 UNKNOWN RECOMMENDED ADAPTE
  - ☐ 04.07 ADAPTER STATUS
  - ☐ 04.08 MACHINES WITH 100MB DRIVES
  - ☐ 04.09 UNVERIFIED EXISTING ADAPTERS
  - ☐ 04.10 PREVIOUS/EXISTING NOT EQUAL
  - ☐ 04.11 ADAPTERS ORDERED
  - ☐ 04.12 ADAPTERS RECEIVED
  - ☐ 04.13 COMPLETE ORDER INFORMATION M
- ▷ 05.0 NETWORK
- ▷ 06.0 SCHEDULING
- ▷ 07.0 EMAILED INVENTORY PROCESS
- ▷ 08.0 BILLING
- ▷ 09.0 BILLING READINESS
- ▷ 10.0 MIGRATION VIEWS
- ▷ 11.0 REPORTING
- ▽ 12.0 GENERAL
  - ☐ 12.01 MIGRATION BY DIVISION
  - ☐ 12.02 MIGRATION BY DATE/DIVISION
  - ☐ 12.03 NEW INVENTORY INFORMATION

METHOD, SYSTEM, AND PROGRAM PRODUCT FOR AUTOMATICALLY POPULATING A FIELD OF A RECORD

BACKGROUND OF THE INVENTION

1. Field of the Invention

In general, the present invention relates to electronic field population. Specifically, the present invention provides a way to populate a field of a record using information determined/extracted from a corresponding entry of a mapping table.

2. Related Art

As Information Technology (IT) continues to advance, many organizations are faced with the task of migrating their existing computer infrastructures, telephone systems and the like to newer technology. For example, an organization might wish to migrate its networking functions from token ring to Ethernet. Similarly, an organization might wish to migrate its telephone service from a landline-based service to a voice-over-IP service.

In performing an IT migration, an organization might be faced with the undaunting task of migrating several hundreds or thousands of computers. As part of the IT migration electronic records might be kept for each computer system for which a migration is being performed. The record could specify some identifying information about the computer system as well as information about the upgrade that is being performed. For example, if an Ethernet adapter was added to a computer system pursuant to the IT migration, the record might indicated the type of adapter, the date of change, etc.

To date, the population of such records has been a manual process. Specifically, one or more individuals will manually input the migration data into various fields of the record. Given the large quantity of computer systems that an IT migration could involve, this can be an expensive and time consuming task. In view of the foregoing, there exists a need for a system that can automatically populate fields of record. Specifically, a need exists for a system that can automatically populate fields of a record (e.g., for an IT migration) using information from another electronic resource such as a mapping table or the like.

SUMMARY OF THE INVENTION

In general, the present invention provides a method, system and program product for automatically populating a field of a record. Specifically, under the present invention an identifier for a computer system undergoing an IT migration is extracted from a pertinent field the record. Thereafter, a mapping table is consulted. The mapping table generally contains entries that associate computer system identifiers with identifiers of hardware components that have been installed (or are to be installed) in the computer systems. Using the computer system identifier extracted from the record, an associated hardware component identifier is determined from the mapping table, and automatically populated into a corresponding field (e.g., a hardware component field) of the record. Thus, the present invention avoids having to manually populate the hardware component identifier into the record.

A first aspect of the present invention provides a method for automatically populating a field of a record, comprising: extracting an identifier of a computer system from a first field of the record; determining an identifier of a hardware component for the computer system from a mapping table using the identifier of the computer system, wherein the mapping table associates identifiers of computer systems with identifiers of hardware components; and automatically populating a second field of the record with the identifier of the hardware component.

A second aspect of the present invention provides a system for automatically populating a field of a record, comprising: a system for extracting an identifier of a computer system from a first field of the record; a system for determining an identifier of a hardware component for the computer system from a mapping table using the identifier of the computer system, wherein the mapping table associates identifiers of computer systems with identifiers of hardware components; and a system for automatically populating a second field of the record with the identifier of the hardware component.

A third aspect of the present invention provides a program product stored on a computer useable medium for automatically populating a field of a record, the program product comprising program code for performing the following steps: extracting an identifier of a computer system from a first field of the record; determining an identifier of a hardware component for the computer system from a mapping table using the identifier of the computer system, wherein the mapping table associates identifiers of computer systems with identifiers of hardware components; and automatically populating a second field of the record with the identifier of the hardware component.

A fourth aspect of the present invention provides a method for deploying an application for automatically populating a field of a record, comprising: providing a computer infrastructure being operable to: extract an identifier of a computer system from a first field of the record; determine an identifier of a hardware component for the computer system from a mapping table using the identifier of the computer system, wherein the mapping table associates identifiers of computer systems with identifiers of hardware components; and automatically populate a second field of the record with the identifier of the hardware component.

A fifth aspect of the present invention provides computer software embodied in a propagated signal for automatically populating a field of a record, the computer software comprising instructions to cause a computer system to perform the following functions: extract an identifier of a computer system from a first field of the record; determine an identifier of a hardware component for the computer system from a mapping table using the identifier of the computer system, wherein the mapping table associates identifiers of computer systems with identifiers of hardware components; and automatically populate a second field of the record with the identifier of the hardware component.

Therefore, the present invention provides a method, system and program product for automatically populating a field of a record.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows an illustrative electronic record prior to automatic population according to the present invention.

FIG. 3 shows an illustrative mapping table according to the present invention.

FIG. 4 shows the record of FIG. 2 after automatic population according to the present invention.

FIG. 5 shows an illustrative summary view according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
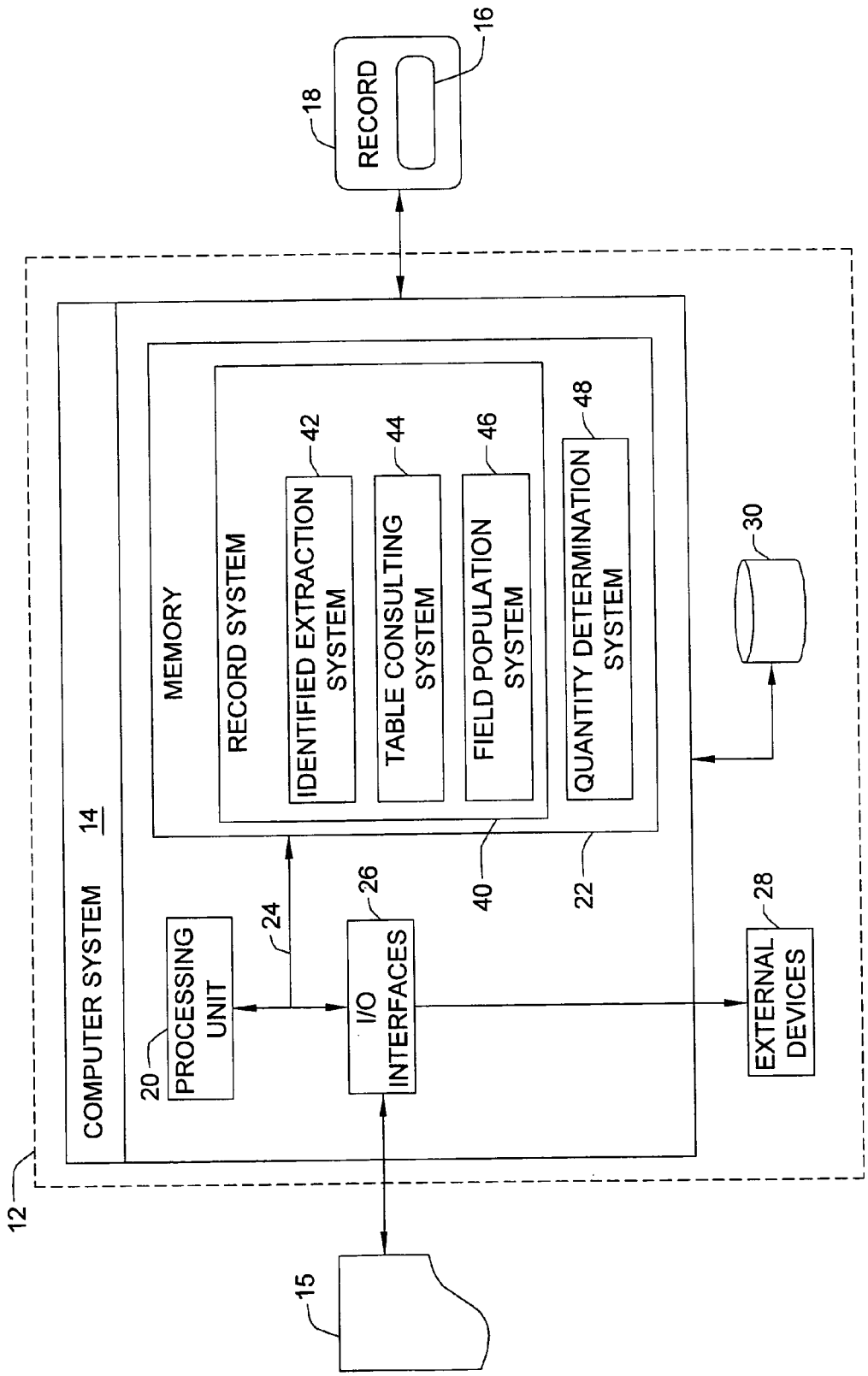
FIG. 1 shows an illustrative system for automatically populating a field of a record according to the present invention.

As indicated above, the present invention provides a method, system and program product for automatically populating a field of a record. Specifically, under the present invention an identifier for a computer system undergoing an IT migration is extracted from a pertinent field the record. Thereafter, a mapping table is consulted. The mapping table generally contains entries that associate computer system identifiers with identifiers of hardware components that have been installed (or are to be installed) in the computer systems. Using the computer system identifier extracted from the record, an associated hardware component identifier is determined from the mapping table, and automatically populated into a corresponding field (e.g., a hardware component field) of the record. Thus, the present invention avoids having to manually populate the hardware component identifier into the record.

Referring now to FIG. 1, a system 10 for automatically populating a field 16 of a record 18 using information from mapping table 15 according to the present invention is shown. As depicted, system 10 includes a computer system 14 deployed within a computer infrastructure 12. This is intended to demonstrate that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, it should be understood that some or all of the components of system 10 could be deployed, managed, serviced, etc. by a service provider who offers to populate fields of records for customers.

In any event, computer system 14 is shown including a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as record system 40, which is stored in memory 22 and/or storage system 30. While executing computer program code, processing unit 20 can read and/or write data, to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention such mapping table 15, records 18, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is record system 40 (e.g., a software agent in a typical embodiment of the present invention), which includes identifier extraction system 42, table consulting system 44, and field population system 46. Also, memory 22 includes quantity determination system 48. Although shown external to record system 40 to illustrate a typical embodiment, it should be understood that quantity determination system 48 could be provided as part of record system 40.

Regardless, assume in an illustrative embodiment that an organization is undergoing an IT migration in which Ethernet adapters are upgraded or otherwise installed on the computer systems thereof. Further assume that record 18 pertains to a particular computer system "A" that is being upgraded pursuant of the IT migration. Still yet, assume that field 16 of record 18 is the field where an identifier for the Ethernet adapter installed on computer system "A" will be listed. Referring to FIG. 2, record 18 is shown in greater detail. As depicted, record 18 includes various fields 16A-N containing information about the IT migration for computer system "A." For example, field 16A answers whether computer system "A" already has a supported adapter. Field 16B answers whether computer system "A" can use an existing unsupported adapter. Field 16N is currently blank and will be automatically populated using information contained in mapping table 15 (FIG. 1) in this illustrative example. Specifically, field 16N is where an identifier of the Ethernet adapter that is being installed (or was installed) on computer system "A" will be listed.

Figure 3:
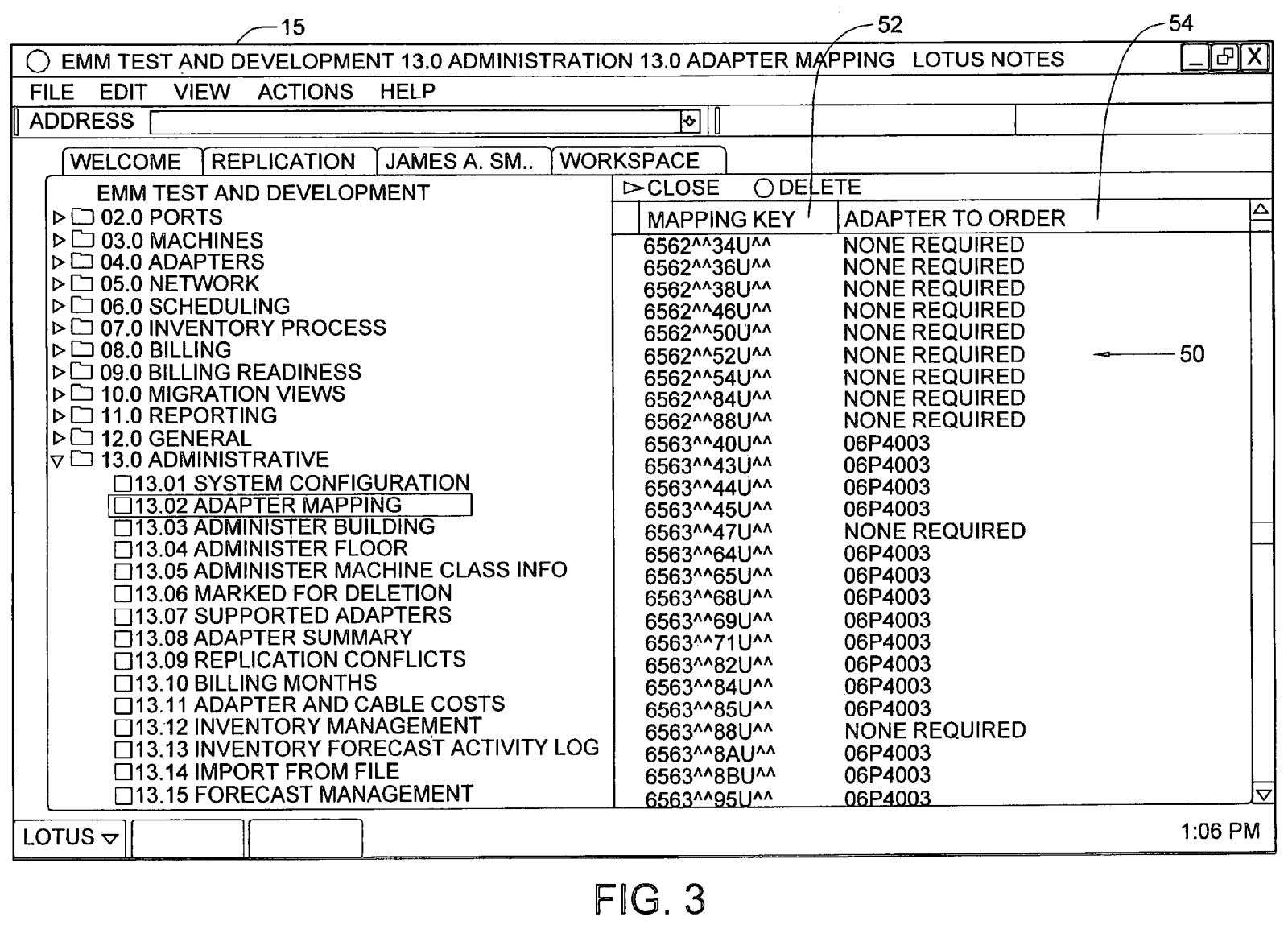

Referring to FIG. 3, a more detailed view of mapping table 15 is shown. In general, mapping table 15 contains entries 50 that associate identifiers of computer systems (hereinafter "computer system identifiers 52") with identifiers of hardware components (hereinafter "hardware component identifiers 54"). It is assumed that the computer system to which computer system identifiers 52 correspond are those computer systems undergoing the IT migration of illustrative embodiment of the present invention. To this extent, further assume that computer system identifier "6563~40U~*" is the computer system identifier for computer system "A." In a typical embodiment, each computer system identifier 52 comprises of a machine type and a model number of the corresponding computer system. Thus, computer system "A" would be model type "6563" and model number "40U". Further, each hardware component identifier 54 typically comprises a part number of the hardware component (e.g., Ethernet adapter) that is needed (or was installed) on the corresponding computer system. As such, the Ethernet adapter needed for computer system "A" has a part number of "06P4003." As further shown in mapping table 15, some entries have a hardware component identifier 54 of "Not Required"). This typically means that the corresponding computer system already has the hardware component that is the subject of the IT migration.

Referring back to FIG. 1, once mapping table 15 and record 18 have been provided (e.g., as illustrated in FIGS. 2 and 3), identifier extraction system 42 will parse record 18 and extract the computer system identifier for computer system "A" from a corresponding field. Specifically, one of the fields of record 18 (not shown in FIG. 1 or 2) will typically include the computer system identifier for the corresponding computer system. For example, if record 18 pertains to computer system "A," then record 18 will include a field that includes the computer system identifier "6563~40U~*". Identifier extraction system 42 is typically programmed to recognize or know what field of record 18 contains the computer system identifier, and to extract the same. Once extracted, table consulting system 44 will consult mapping table 15 (e.g., as stored in memory 22, storage system 30 or obtained from another location) using the computer system identifier to determine/extract the associated hardware component identifier. From the entry for computer system identifier "6563~40U~*" in FIG. 3, table consulting system 44 will determine that the associated hardware component identifier for computer system "A" is "06P4003." Once the hardware component identifier is determined, field population system 46 will automatically populate field 16 (field 16N of FIG. 2) with the same. Referring now to FIG. 4, this is shown in greater detail. Specifically, FIG. 4 depicts record 18 after the hardware component identifier has been automatically populated into field 16N.

Referring back to FIG. 1, memory 22 is shown as further including quantity determination system 48. In general, quantity determination system 48 allows records to be summarized and a corresponding view generated. Specifically, assume that computer system "A" is one of many computer systems undergoing an IT migration in which Ethernet adapters and other hardware components are being installed. Further assume that the Ethernet adapter for computer system "A" (e.g., having the hardware component identifier "06P4003"), is one of many different components that will be needed. Quantity determination system 48 will, among other things, provide quantities for the different types of hardware components that are being installed.

Referring to FIG. 5, a view 60 provided by quantity determination system 48 is shown. As can be seen, there is one computer system that requires a hardware component whose hardware component identifier is "02N7191." As can be further seen, there are thirty-six computer systems (including computer system "A" of the illustrative example) that will need the Ethernet adapter having the hardware component identifier "06P4003." Other quantities of needed hardware components can be seen as well in FIG. 5. Accordingly, view 60 provides a convenient snapshot of the resources needed for the IT migration.

As indicated above, the present invention can be implemented via a software agent. Shown below is code for a software agent implementation of record system 40 of FIG. 1:

```
VN_MachType = Ucase(DOC_EMM.FN_MachineType(0))
    VN_MachModel = Ucase(DOC_EMM.FN_MachineModel(0))
    VN_MachClass = Ucase(DOC_EMM.FN_MachineClass(0))
    Set DOC_mapping=VW_EMMlookup.
GetDocumentByKey(VN_MachType & "~" & VN_MachModel & "~*", True)
    If DOC_mapping Is Nothing And vn_mappingdone = "No" Then
        Set
DOC_mapping=VW_EMMlookup.GetDocumentByKey(VN_MachType & "~*~*", True)
    Else
        If vn_mappingdone = "No" Then
            Call UpdateAdapterInfo(DOC_EMM,DOC_Mapping)
        End If
    End If
    If DOC_mapping Is Nothing And vn_mappingdone = "No" Then
        Set
DOC_mapping=VW_EMMlookup.
GetDocumentByKey(Left(VN_MachType,1) & "*~*~*", True)
    Else
        If vn_mappingdone = "No" Then
            Call UpdateAdapterInfo(DOC_EMM,DOC_Mapping)
        End If
    End If
    If DOC_mapping Is Nothing And vn_mappingdone = "No" Then
        Set
            DOC_mapping=VW_EMMlookup.GetDocumentByKey("*~*~" & VN_MachClass, True)
    Else
        If vn_mappingdone = "No" Then
            Call UpdateAdapterInfo(DOC_EMM,DOC_Mapping)
        End If
    End If
    If DOC_mapping Is Nothing And vn_mappingdone = "No" Then
        If DOC_EMM.FN_AdapterType(0) ="" Then
            DOC_EMM.FN_AdapterType = "Unknown"
        End If
        DOC_EMM.FN_SupportedAdapter = "Unknown"
    Else
        If vn_mappingdone = "No" Then
            Call UpdateAdapterInfo(DOC_EMM,DOC_Mapping)
        End If
    End If
End If
```

While shown and described herein as a method and system for automatically populating a field of a record, it is understood that the invention further provides various alternative embodiments. For example, in one embodiment, the invention provides a computer-readable medium that includes computer program code to enable a computer infrastructure to automatically populate a field of a record. To this extent, the computer-readable medium includes program code that implements each of the various process steps of the invention. It is understood that the term "computer-readable medium"

comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as a Solution Integrator, could offer to extract information from an identifier. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for automatically populating a field of a record. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/soft-ware program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims. For example, although the present invention describes automatically populating a hardware identifier field of a record with a hardware identifier, any field of the record for the IT migration could be automatically populated using information from a suitable mapping table.

We claim:

1. A method of managing information regarding an information technology (IT) migration, the method comprising:

reading data from a plurality of computer system records with a software agent executing on a management computer system, the plurality of records including a unique record for each of a plurality of computer systems undergoing the IT migration, each of the plurality of records including at least one field corresponding to a changeable component of the computer system and including at least one field identifying an attribute of the computer system;

reading data from a mapping table including a plurality of mapping records with the software agent executing on the management computer system, each of the plurality of mapping records including at least one field corresponding to an attribute of a computer system and at least one field corresponding to a required action for the changeable component as part of the IT migration, wherein the software agent is configured to only read data from the mapping table; and automatically populating, with the software agent executing on the management computer system, the at least one field corresponding to the changeable component of the computer system in each of the plurality of computer system records by:

extracting at least one attribute of the computer system from the computer system record;

determining the required action for the changeable component of the computer system using the at least one attribute of the computer system and the mapping table; and populating the at least one field corresponding to the changeable component of the computer system in the computer system record with the required action.

2. The method of claim 1, further comprising:

determining, with the software agent executing on the management computer system, a quantity of each unique required action for the changeable component required for the IT migration based on the at least one field corresponding to the changeable component of the computer system in the plurality of computer system records after the automatically populating; and providing, with the software agent executing on the management computer system, the quantity corresponding to each unique required action for the changeable component for use by a user.

3. The method of claim 1, wherein the changeable component comprises an Ethernet adapter and the required action comprises a part number of a new Ethernet adapter required for the computer system as part of the IT migration.

4. The method of claim 1, wherein the extracted at least one attribute of the computer system includes at least one of: a machine type, a model number, or a machine class for the computer system.

5. The method of claim 4, wherein the determining includes:

attempting to select a record in the mapping table using the machine type and the model number;

using a corresponding required action when a record is successfully selected using the machine type and the model number;

attempting to select a record in the mapping table using only the machine type when a record is not successfully selected using the machine type and the model number; and using a corresponding required action when a record is successfully selected using only the machine type.

6. The method of claim 5, wherein the determining further includes:

attempting to select a record in the mapping table using only the machine class when a record is not successfully selected using the machine type and the model number and when a record is not successfully selected using only the machine type;

using a corresponding required action when a record is successfully selected using only the machine class; and using a default required action when a record is not successfully selected: using the machine type and the model number, using only the machine type, and using only the machine class.

7. A migration management computer system comprising:

a software agent executing on the migration management computer system, wherein the software agent is configured to manage information regarding an information technology (IT) migration by:

reading data from a plurality of computer system records, the plurality of records including a unique record for each of a plurality of computer systems undergoing the IT migration, each of the plurality of records including at least one field corresponding to a changeable component of the computer system and including at least one field identifying an attribute of the computer system;

reading data from a mapping table including a plurality of mapping records, each of the plurality of mapping records including at least one field corresponding to an attribute of a computer system and at least one field corresponding to a required action for the changeable component as part of the IT migration, wherein the software agent is configured to only read data from the mapping table; and automatically populating the at least one field corresponding to the changeable component of the computer system in each of the plurality of computer system records by:

extracting at least one attribute of the computer system from the computer system record;

determining the required action for the changeable component of the computer system using the at least one attribute of the computer system and the mapping table; and populating the at least one field corresponding to the changeable component of the computer system in the computer system record with the required action.

8. The computer system of claim 7, wherein the software agent further manages the information regarding the IT migration by:

determining a quantity of each unique required action for the changeable component required for the IT migration based on the at least one field corresponding to the changeable component of the computer system in the plurality of computer system records after the automatically populating; and providing the quantity corresponding to each unique required action for the changeable component for use by a user.

9. The computer system of claim 7, wherein the changeable component comprises an Ethernet adapter and the required action comprises a part number of a new Ethernet adapter required for the computer system as part of the IT migration.

10. The computer system of claim 7, wherein the extracted at least one attribute of the computer system includes at least one of: a machine type, a model number, or a machine class for the computer system.

11. The computer system of claim 10, wherein the determining includes:

attempting to select a record in the mapping table using the machine type and the model number;

using a corresponding required action when a record is successfully selected using the machine type and the model number;

attempting to select a record in the mapping table using only the machine type when a record is not successfully selected using the machine type and the model number; and using a corresponding required action when a record is successfully selected using only the machine type.

12. The computer system of claim 11, wherein the determining further includes:

attempting to select a record in the mapping table using only the machine class when a record is not successfully selected using the machine type and the model number and when a record is not successfully selected using only the machine type;

using a corresponding required action when a record is successfully selected using only the machine class; and using a default required action when a record is not successfully selected: using the machine type and the model number, using only the machine type, and using only the machine class.

13. A program product stored on a computer readable storage medium, the computer readable storage medium comprising program code, which when executed by a computer system, enables the computer system to manage information regarding an information technology (IT) migration by:

reading data from a plurality of computer system records, the plurality of records including a unique record for each of a plurality of computer systems undergoing the IT migration, each of the plurality of records including at least one field corresponding to a changeable component of the computer system and including at least one field identifying an attribute of the computer system;

reading data from a mapping table including a plurality of mapping records, each of the plurality of mapping records including at least one field corresponding to an attribute of a computer system and at least one field corresponding to a required action for the changeable component as part of the IT migration, wherein the software agent is configured to only read data from the mapping table; and automatically populating the at least one field corresponding to the changeable component of the computer system in each of the plurality of computer system records by:

extracting at least one attribute of the computer system from the computer system record;

determining the required action for the changeable component of the computer system using the at least one attribute of the computer system and the mapping table; and populating the at least one field corresponding to the changeable component of the computer system in the computer system record with the required action.

14. The program product of claim 13, wherein the program code further enables the computer system to manage the information regarding the IT migration by:

determining a quantity of each unique required action for the changeable component required for the IT migration based on the at least one field corresponding to the changeable component of the computer system in the plurality of computer system records after the automatically populating; and presenting the quantity corresponding to each unique required action for the changeable component for use by a user.

15. The program product of claim 13, wherein the changeable component comprises an Ethernet adapter and the required action comprises a part number of a new Ethernet adapter required for the computer system as part of the IT migration.

16. The program product of claim 13, wherein the extracted at least one attribute of the computer system includes at least one of: a machine type, a model number, or a machine class for the computer system.

17. The program product of claim 16, wherein the determining includes:
   attempting to select a record in the mapping table using the machine type and the model number;
   using a corresponding required action when a record is successfully selected using the machine type and the model number;
   attempting to select a record in the mapping table using only the machine type when a record is not successfully selected using the machine type and the model number; and
   using a corresponding required action when a record is successfully selected using only the machine type.

18. The program product of claim 17, wherein the determining further includes:
   attempting to select a record in the mapping table using only the machine class when a record is not successfully selected using the machine type and the model number and when a record is not successfully selected using only the machine type;
   using a corresponding required action when a record is successfully selected using only the machine class; and
   using a default required action when a record is not successfully selected: using the machine type and the model number, using only the machine type, and using only the machine class.

19. A method for deploying a computer infrastructure, the method comprising:
   providing a migration management computer system configured to manage information regarding an information technology (IT) migration by:
      reading data from a plurality of computer system records, the plurality of records including a unique record for each of a plurality of computer systems undergoing the IT migration, each of the plurality of records including at least one field corresponding to a changeable component of the computer system and including at least one field identifying an attribute of the computer system;
      reading data from a mapping table including a plurality of mapping records, each of the plurality of mapping records including at least one field corresponding to an attribute of a computer system and at least one field corresponding to a required action for the changeable component as part of the IT migration, wherein the software agent is configured to only read data from the mapping table; and
      automatically populating the at least one field corresponding to the changeable component of the computer system in each of the plurality of computer system records by:
         extracting at least one attribute of the computer system from the computer system record;
         determining the required action for the changeable component of the computer system using the at least one attribute of the computer system and the mapping table; and
         populating the at least one field corresponding to the changeable component of the computer system in the computer system record with the required action.

20. The method of claim 19, wherein the migration management computer system is further configured to manage the information regarding the IT migration by:
   determining a quantity of each unique required action for the changeable component required for the IT migration based on the at least one field corresponding to the changeable component of the computer system in the plurality of computer system records after the automatically populating; and
   presenting the quantity corresponding to each unique required action for the changeable component for use by a user.

* * * * *